United States Patent
Segev et al.

(10) Patent No.: US 9,544,065 B2
(45) Date of Patent: Jan. 10, 2017

(54) METHOD AND SYSTEM FOR TRANSMITTING LIGHT

(71) Applicant: Technion Research & Development Foundation Limited, Haifa (IL)

(72) Inventors: Mordechai Segev, Haifa (IL); Oren Cohen, Haifa (IL); Liad Levi, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 14/327,702

(22) Filed: Jul. 10, 2014

(65) Prior Publication Data

US 2015/0016826 A1 Jan. 15, 2015

(30) Foreign Application Priority Data

Jul. 11, 2013 (IL) .......................................... 227458

(51) Int. Cl.
*H04B 10/00* (2013.01)
*H04B 10/80* (2013.01)

(52) U.S. Cl.
CPC .................................... *H04B 10/80* (2013.01)

(58) Field of Classification Search
USPC ................................................ 398/182–201
See application file for complete search history.

(56) References Cited

U.S. PATENT DOCUMENTS

| | | | | |
|---|---|---|---|---|
| 3,873,825 A * | 3/1975 | Jones | ........................ | G01J 3/12 359/589 |
| 4,633,524 A * | 12/1986 | Hasegawa | .......... | H04B 10/2916 359/276 |
| 4,741,587 A * | 5/1988 | Jewell | .................... | G02F 1/3534 385/1 |
| H000855 H * | 12/1990 | Otto | ..................... | G02B 6/3504 385/25 |
| 5,304,357 A * | 4/1994 | Sato | .................. | H01L 21/67121 117/39 |
| 5,637,244 A * | 6/1997 | Erokhin | .................... | B41M 5/26 219/121.69 |
| 5,916,460 A * | 6/1999 | Imoto | .................... | B23K 26/12 219/121.67 |
| 6,115,526 A * | 9/2000 | Morse | ............... | C03B 37/01211 385/125 |
| 6,285,002 B1 * | 9/2001 | Ngoi | ..................... | B08B 7/0042 219/121.68 |
| 6,509,548 B1 * | 1/2003 | Troitski | ............... | B23K 26/362 219/121.61 |
| 6,718,103 B2 * | 4/2004 | Cruz | ....................... | G02B 6/32 362/385 |
| 7,215,491 B2 * | 5/2007 | Ueno | ...................... | G02F 1/293 359/244 |
| 7,486,705 B2 * | 2/2009 | Shah | ....................... | G01J 11/00 372/25 |
| 7,595,491 B2 * | 9/2009 | Zhang | ................ | G01N 21/3581 250/341.1 |

(Continued)

*Primary Examiner* — Agustin Bello

(57) ABSTRACT

A method of transmitting light is disclosed. The method comprises: transmitting a first light pulse into a medium to form in the medium a filamented region that is capable of guiding light, and transmitting a second light into the filamented region, wherein the second light is a pulsed light or continues wave light, and wherein the second light is transmitted at least 10 nanoseconds after the first light pulse.

27 Claims, 8 Drawing Sheets
(6 of 8 Drawing Sheet(s) Filed in Color)

(56) References Cited

U.S. PATENT DOCUMENTS

| | | | | |
|---|---|---|---|---|
| 7,792,398 | B2* | 9/2010 | Tanaka | H04Q 11/0005 359/244 |
| 7,903,698 | B1* | 3/2011 | Lundquist | G02F 1/3511 372/109 |
| 7,930,967 | B2* | 4/2011 | Marquis | F41H 11/02 89/36.11 |
| 8,208,505 | B2* | 6/2012 | Dantus | G01B 9/02014 250/281 |
| 8,300,669 | B2* | 10/2012 | Dantus | G01J 11/00 250/458.1 |
| 8,314,359 | B2* | 11/2012 | Bovatsek | B23K 26/0617 219/121.63 |
| 8,319,435 | B1* | 11/2012 | Wood | H05H 1/48 315/111.21 |
| 8,320,764 | B2* | 11/2012 | Charlet | H04B 10/532 398/105 |
| 8,351,476 | B1* | 1/2013 | Hubbard | H05G 2/00 372/25 |
| 8,433,168 | B2* | 4/2013 | Filippov | C03B 37/02763 385/126 |
| 8,665,923 | B2* | 3/2014 | Sprangle | H01S 3/104 372/5 |
| 8,742,667 | B2* | 6/2014 | Mysyrowicz | H02G 13/20 315/111.21 |
| 8,884,181 | B2* | 11/2014 | Houde | G21K 5/00 219/121.6 |
| 8,941,967 | B2* | 1/2015 | Jones | G02F 1/3511 361/220 |
| 9,088,123 | B2* | 7/2015 | Jones | H01S 1/04 |
| 9,102,007 | B2* | 8/2015 | Hosseini | B23K 26/0039 |
| 9,102,011 | B2* | 8/2015 | Hosseini | B23K 26/0069 |
| 9,138,913 | B2* | 9/2015 | Arai | B23K 26/0635 |
| 2002/0162360 | A1* | 11/2002 | Schaffer | C03C 23/0025 65/392 |
| 2003/0006221 | A1* | 1/2003 | Hong | B23K 26/0604 219/121.72 |
| 2005/0226287 | A1* | 10/2005 | Shah | G01J 11/00 372/25 |
| 2006/0000814 | A1* | 1/2006 | Gu | B23K 26/0084 219/121.69 |
| 2008/0225383 | A1* | 9/2008 | Theberge | G02F 1/3511 359/326 |
| 2010/0084384 | A1* | 4/2010 | Bovatsek | B23K 26/0617 219/121.64 |
| 2011/0254448 | A1* | 10/2011 | Mysyrowicz | H02G 13/20 315/111.21 |
| 2012/0114007 | A1* | 5/2012 | Jones | G02F 1/3511 372/51 |
| 2012/0170599 | A1* | 7/2012 | Sprangle | H01S 3/2237 372/5 |
| 2013/0148685 | A1* | 6/2013 | Jones | H01S 1/04 372/51 |
| 2014/0231679 | A1* | 8/2014 | Kremeyer | G02F 1/3511 250/505.1 |
| 2015/0016826 | A1* | 1/2015 | Segev | H04B 10/80 398/182 |
| 2015/0034612 | A1* | 2/2015 | Hosseini | B23K 26/0069 219/121.61 |
| 2015/0146338 | A1* | 5/2015 | Jones | G02F 1/3511 361/231 |

* cited by examiner

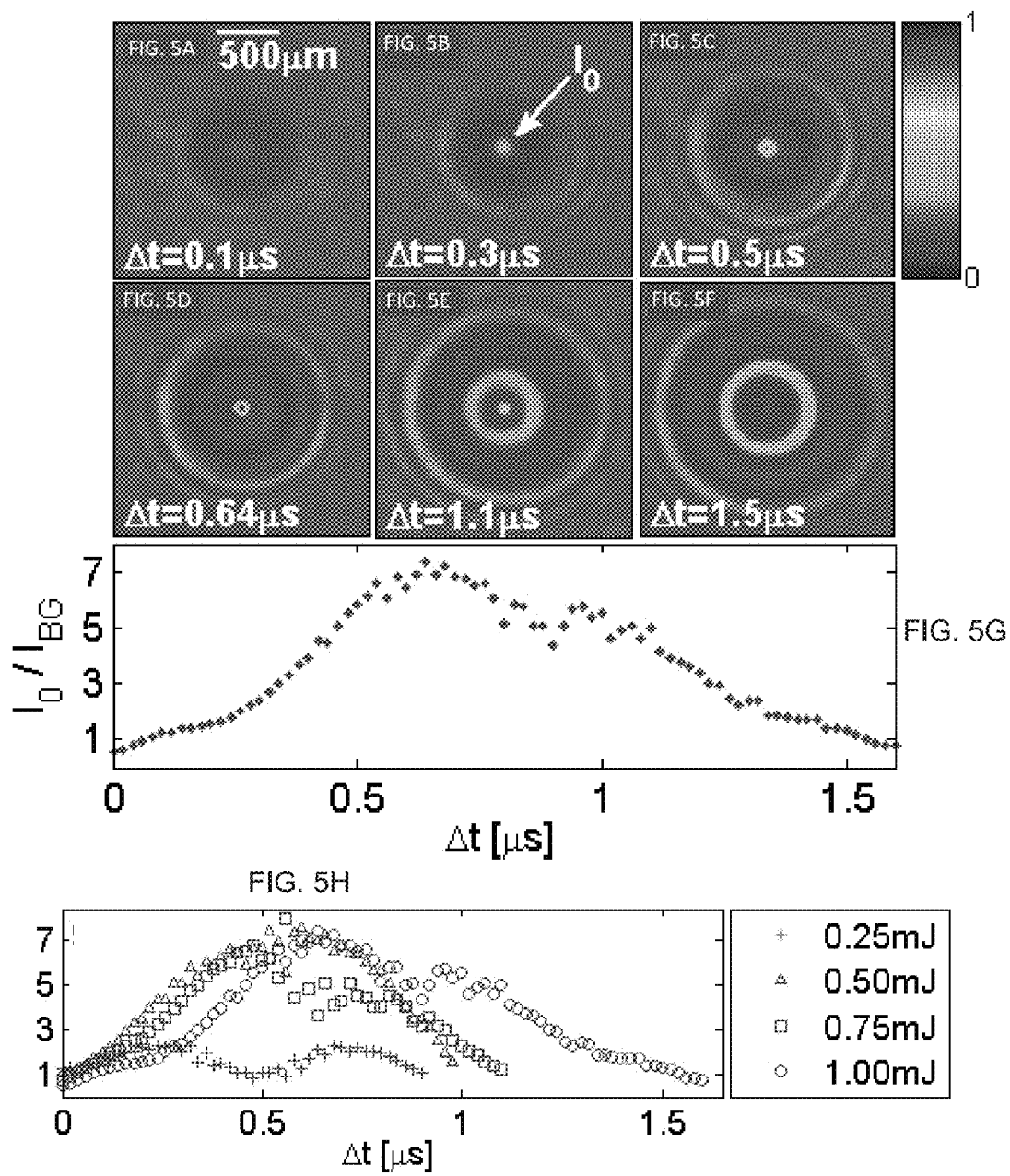

FIG. 7A  FIG. 7B
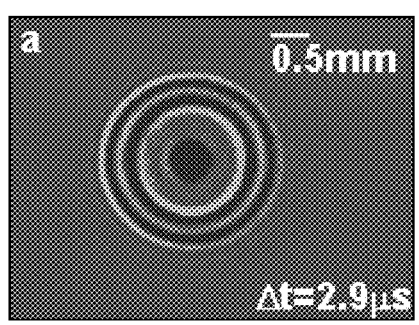 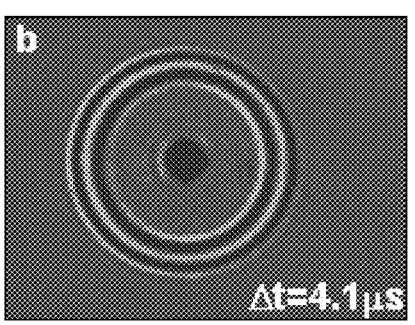 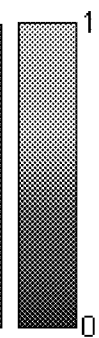
FIG. 7C  FIG. 7D
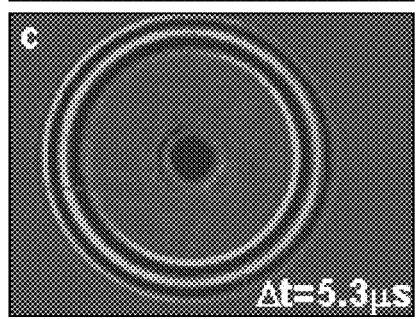 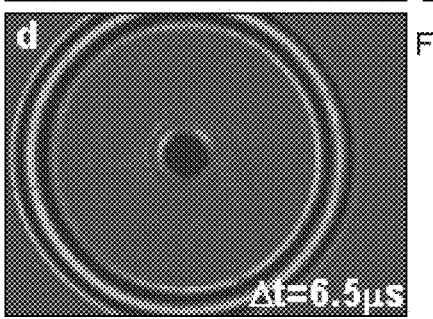
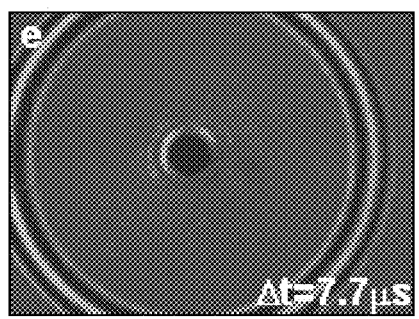 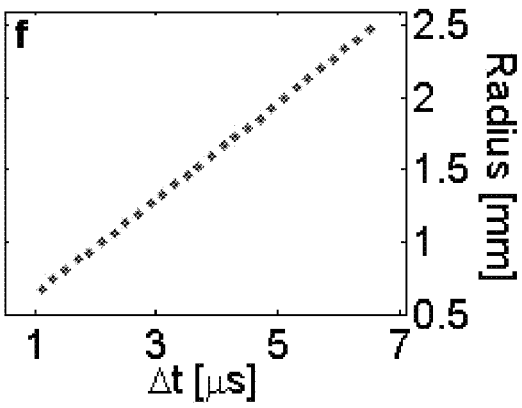
FIG. 7E  FIG. 7F

METHOD AND SYSTEM FOR TRANSMITTING LIGHT

RELATED APPLICATION

This application claims the benefit of priority of Israel Patent Application No. 227458 filed Jul. 11, 2013, the contents of which are incorporated herein by reference in their entirety.

FIELD AND BACKGROUND OF THE INVENTION

The present invention, in some embodiments thereof, relates to optics and, more particularly, but not exclusively, to a method and system for transmitting light via light filamentation.

When electromagnetic radiation is focused to a point to ionize a fluid, the resulting plasma diffracts the light and dispersion occurs. However, high-power pico- and femtosecond-duration laser pulses have been found to propagate over large distances, while ionizing the fluid in their path. This phenomenon is referred to in the literature as light filamentation.

Filamentation has been observed using a variety of gases, such as nitrogen, helium, and air. Filamentation has also been demonstrated in liquids and solids, although with shorter propagation lengths. The wavelengths for filamentation have been observed ranging from infrared to ultraviolet.

A light filament is typically formed when a femtosecond pulse with peak intensity above the critical power for collapse is propagating in a transparent medium [A. Braun, G. Korn, X. Liu, D. Du, J. Squier, and G. Mourou, Opt. Lett. 20, 73 (1995)]. In air, the diameter of a light filament is approximately 100 µm and it can propagate over distances much longer than the Rayleigh length [Rodriguez et al., Phys. Rev. E 69, 036607 (2004); Kasparian et al., Science, 301, 61 (2003); Méchain et al., Appl. Phys. B: Lasers Opt. B79, 379 (2004); Mills et al., Opt. Lett., 38, 25 (2013); Chin et al, Appl. Phys. B74, 67-76 (2002)].

Quantum rotational wave packets have been observed in atmospheric air on filamentary propagation of femtosecond laser pulses [Varma et al., Phys. Rev. Lett. 101, 205001 (2008)]. This study reports that a probe filament that is by several tens of picoseconds or less with respect to a pump filament can be sucked into the pump filament's molecular quantum wake and be either trapped or destroyed by it.

Recently, it was discovered that on a millisecond timescale, a laser pulse leaves a density hole that reduces the index of refraction at the center of the beam as a result of heating [Cheng et al., Optics Express, 21 4740 (2013)]. This phenomenon has a defocusing effect on a next pulse in a sequence of pulses.

SUMMARY OF THE INVENTION

According to an aspect of some embodiments of the present invention there is provided a method of transmitting light. The method comprises: transmitting a first light pulse into a medium to form in the medium a filamented region that is capable of guiding light; and transmitting a second light into the filamented region, wherein the second light is a pulsed light or continues wave (CW) light, and wherein the second light is transmitted at least 10 nanoseconds after the first light pulse.

According to some embodiments of the present invention the filamented region is characterized by a refractive index profile that is different from the refractive index of the medium in the absence of the light pulse. In some embodiments, the refractive index profile is such that the refractive index of the filament is higher than the refractive index of the medium in the absence of the light pulse. In some embodiments, the refractive index profile is such that the refractive index is non-uniform along the transverse direction. In some embodiments, the refractive index at the center of the filament is higher than at the periphery of the filament.

According to an aspect of some embodiments of the present invention there is provided a method of processing a material. The method comprises executing the method as delineated above and optionally as exemplified below, and directing the first light pulse and the second light onto the material.

According to some embodiments of the invention the material is a solid substrate and the second light is selected to form a scribed region onto a surface of the substrate.

According to some embodiments of the invention the material is a solid substrate transparent to the light pulses, wherein the second light is selected to form a scribed region buried under an external surface of the substrate.

According to some embodiments of the invention the second light is selected to at least partially melt or evaporate the material.

According to some embodiments of the invention the second light is selected for destructing an object which comprises the material and is located at a remote location.

According to some embodiments of the invention the method is executed so as to induce water condensation in the medium.

According to some embodiments of the invention the first light pulse is transmitted in a first direction, and the method comprises transmitting a third light pulse into the medium in a second direction. The second direction intersects the first direction so as to form at a transient interference pattern between the first and the third light pulses. In these embodiments, the second light is optionally and preferably transmitted to the interference pattern to effect diffraction of the second light by the transient interference pattern.

According to some embodiments of the invention the second light encodes an optical communication signal, wherein the interference pattern is selected to redirect the optical communication signal to a remote optical communication receiver.

According to some embodiments of the invention the first light pulse and the second light are transmitted from the same location. According to some embodiments of the invention the first light pulse and the second light are transmitted from different locations.

According to some embodiments of the invention the first light pulse and the second light are transmitted using the same light source. According to some embodiments of the invention the first light pulse and the second light are transmitted using different light sources.

According to an aspect of some embodiments of the present invention there is provided a system for transmitting light, referred to below as a light-transmission system. The system comprises: at least one light source configured for transmitting light pulses; and a controller configured for activating the at least one light source to transmit a first light pulse into a medium to form in the medium a filamented region that is capable of guiding light, and to transmit a second light into the filamented region, wherein the second light is a pulsed light or continues wave (CW) light, and wherein the second light is transmitted at least 10 nanoseconds after the first light pulse.

According to some embodiments of the invention the at least one light source comprises a first light source for transmitting the first light pulse, and a second light source for transmitting the second light.

According to some embodiments of the invention the system comprises one light source for transmitting both the first light pulse and the second light.

According to an aspect of some embodiments of the present invention there is provided an optical communication system. The optical communication system comprises the light-transmission system as delineated above and optionally as exemplified below.

According to an aspect of some embodiments of the present invention there is provided a system for processing a material. The system for processing a material comprises the light-transmission system as delineated above and optionally as exemplified below.

According to some embodiments of the invention the second light is transmitted at least 100 nanoseconds after the first light pulse. According to some embodiments of the invention the second light is transmitted at least 500 nanoseconds after the first light pulse. According to some embodiments of the invention the second light is transmitted at least 1 microsecond after the first light pulse. According to some embodiments of the invention the second light is transmitted at least 1 millisecond after the first light pulse.

According to some embodiments of the invention a duration of the first light pulse is less than one picosecond.

According to some embodiments of the invention the first light pulse has energy of at least 100 microjoule.

According to an aspect of some embodiments of the present invention there is provided a method of generating a refractive index pattern. The method comprises: transmitting first pump pulse into a medium along a first direction, and a second pump pulse into the medium along a second direction. Each of the first and the second pump pulses is preferably selected to effect a transient change (e.g., increment) in the refractive index of the medium. In various exemplary embodiments of the invention the first and the second directions are selected to intersect each other at an intersection region, and to form in the intersection region a refractive index pattern corresponding to an interference pattern of the pump pulses.

According to some embodiments of the invention the method further comprises transmitting a probe light to the refractive index pattern to effect diffraction of the probe pulse by the refractive index pattern.

According to some embodiments of the invention the probe pulses encodes an optical communication signal.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart diagram of a method suitable for transmitting light, according to various exemplary embodiments of the present invention;

FIG. 2 is a flowchart diagram of a method suitable for generating a pattern of high refractive-index, according to various exemplary embodiments of the present invention;

FIG. 3 is a schematic illustration showing the principles of the method shown in FIG. 2;

FIG. 4 is a schematic illustration of an experimental setup used in experiments performed according to some embodiments of the present invention;

Figures 8A, 8B:
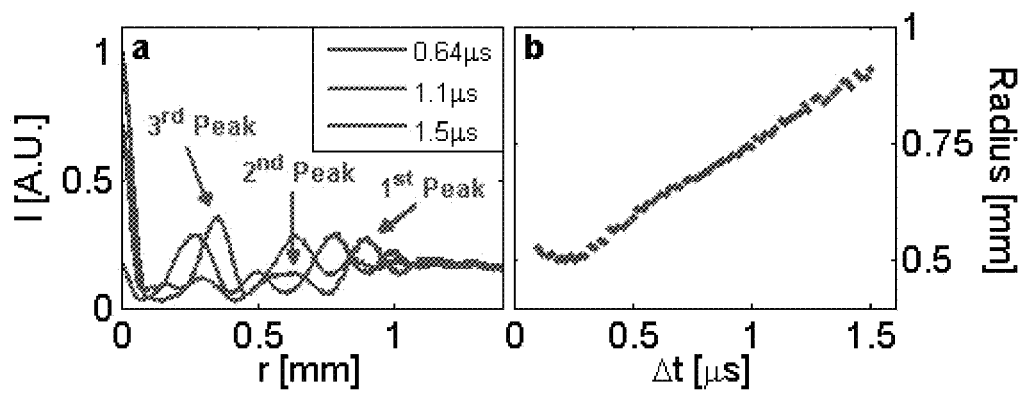
Figure 9A:
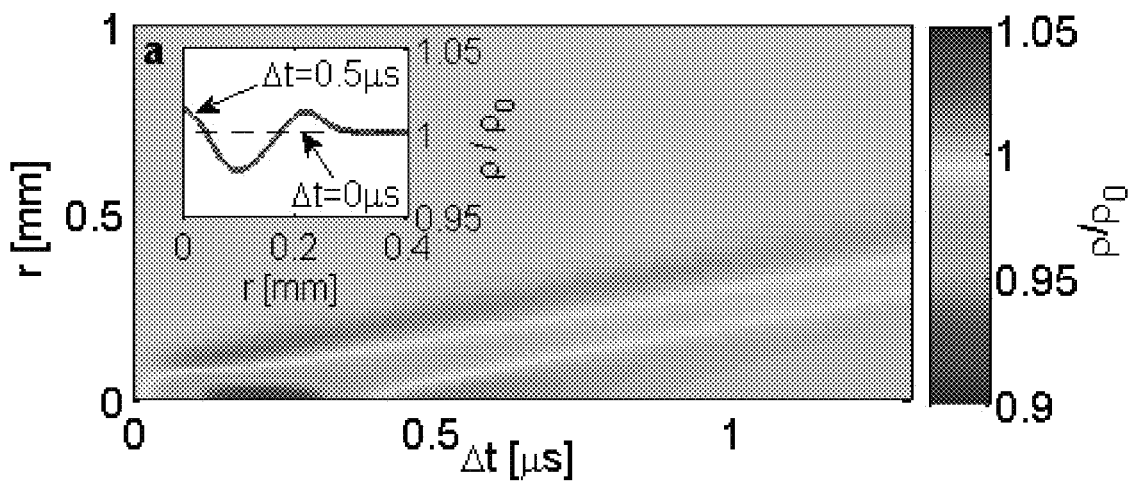
Figure 9B:
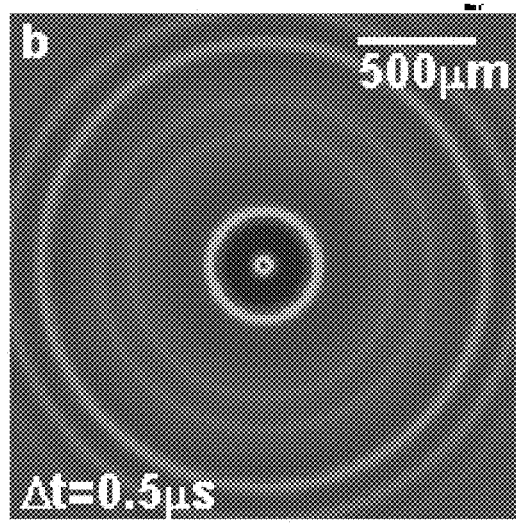
Figure 9C:
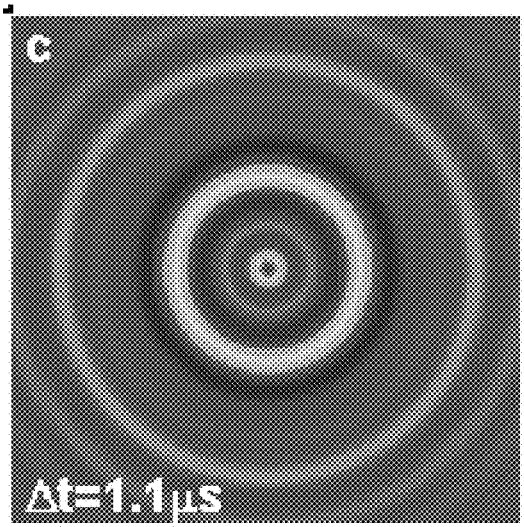

FIGS. 5A-F show intensity patterns of an output probe beam at an output plane for several delay times with respect to a filament pulse, as obtained in experiments performed according to some embodiments of the present invention;

FIGS. 5G-H show the ratio between peak intensity and background intensity, as obtained in experiments performed according to some embodiments of the present invention;

FIGS. 6A-D demonstrate filament-induced wave guiding, obtained in experiments performed according to some embodiments of the present invention;

FIGS. 7A-F show formation and outward propagation of a sonic wave formed by a light filament, as obtained in experiments performed according to some embodiments of the present invention;

FIGS. 8A-B are graphs that demonstrate formation of acoustic pulse, as obtained in experiments performed according to some embodiments of the present invention; and FIGS. 9A-C show dynamics of the air density as simulated by computerized hydrodynamic simulations, according to some embodiments of the present invention.

DESCRIPTION OF SPECIFIC EMBODIMENTS OF THE INVENTION

The present invention, in some embodiments thereof, relates to optics and, more particularly, but not exclusively, to a method and system for transmitting light via light filamentation.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
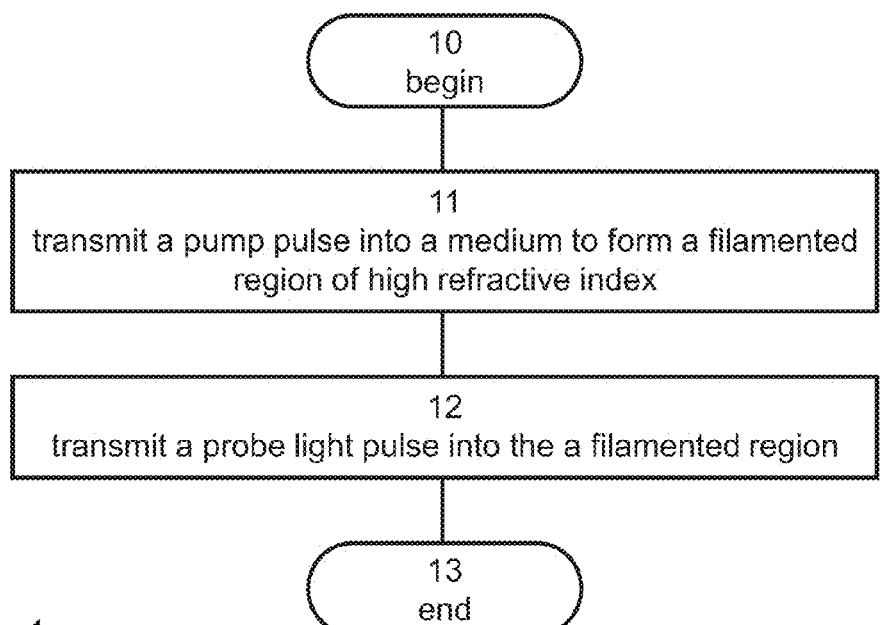

FIG. 1 is a flowchart diagram of a method suitable for transmitting light, according to various exemplary embodiments of the present invention.

The method begins at 10 and continues to 11 at which a first light pulse (e.g., a laser pulse) is transmitted into a medium. The medium is preferably, but not necessarily, a gaseous medium, e.g., air. The first light pulse is interchangeably referred to herein as a pump pulse.

The parameters of the first light pulse (e.g., duration and energy) are preferably selected such as to form in the medium a filamented region that is capable of guiding light. The filamented region is surrounded by the parts of the medium that are off the optical path of the first pulse. The filamented region is characterized by a refractive index profile that is different from the refractive index of the medium in the absence of the light pulse.

As used herein, "refractive index profile" refers to the dependence of the refractive index on a coordinate along a direction that is perpendicular to the propagation direction of the light. A direction that is perpendicular to the propagation direction of the light is referred to as a transverse direction. For example, when the light pulse has a cylindrical symmetry defining a radial direction and an axial direction, the radial direction is a transverse direction, and the refractive index profile refers to the dependence of the refractive index on the radial direction.

In some embodiments of the present invention, the refractive index profile of the filament is such that the refractive index of the filament is higher than the refractive index of the medium in the absence of the light pulse. Thus, in these embodiments, the refractive index of the surrounding medium, which is undisturbed by the first light pulse, is lower than the refractive index of the filamented region which was increased by the light pulse.

In some embodiments, the refractive index profile of the filament is such that the refractive index is non-uniform along the transverse direction. Typically, the refractive index at the center of the filament is higher than at the periphery of the filament. In some embodiments, the values of the refractive index both at the center and at the periphery of the filament are lower than the refractive index of the surrounding medium, which is undisturbed by the first light pulse.

Representative examples of pulse durations suitable for the pump pulse of the present embodiments, include, without limitation, any duration not above 1 ps, e.g., less than 900 fs or less than 500 fs or less than 100 fs. Representative examples of pulse energy suitable for the present embodiments, include, without limitation, any energy level from about 100 microjoule ($\mu$J) to about 100 millijoule (mJ) per pulse. In experiments performed by the present invention a pulse duration of 50 fs and pulse energy of 1 mJ per pulse have been employed.

In some embodiments of the present invention the pump pulse is focused onto a region in the medium at some distance from the aperture of the light source that emits the pulse. The diameter of the focal point of the pump pulse is typically from about 50 $\mu$m to about 200 $\mu$m.

The present inventors found that the refractive-index profile of the filamented region formed in the medium by the first pulse can be used as a waveguide for other light pulses. Another light pulse or continues wave (CW) light can successfully enter the filamented region to propagate therein. Since the refractive index is higher at the center of filamented region than for the periphery of the center (or higher than the surrounding medium), a sufficiently large propagation angle of the other light pulse can result in spatial confinement, wherein the energy of the other light pulse is trapped within the filamented region created by the first light pulse. The spatial confinement is generally two-dimensional allowing the second pulse or CW light to propagate only along the filamented region. Without wishing to be bound by any particular theory, it is believed that the spatial confinement occurs either according to the principle of total internal reflection or according to the principle of refraction off a graded-index boundary.

The present inventors have unexpectedly found that the filamented region with a refractive index profile survives for a relatively prolong relaxation time period (e.g., at least 10 or more than nanoseconds) and can therefore be used as a relatively long (e.g., more than 1 kilometer in length) waveguide.

Thus, in various exemplary embodiments of the invention the method continues to 12 at which a second light pulse or a CW light is transmitted into the filamented region.

The second light pulse or CW light is interchangeably referred to herein as the probe light. The probe light is optionally and preferably transmitted at least 10 ns or more than 10 ns or at least 100 ns or at least 1 $\mu$s or at least 10 $\mu$s or at least 100 $\mu$s or at least 1 ms after first light pulse. Preferably, the probe light is transmitted at an angle selected to ensure two-dimensional confinement of the probe pulse within the filamented region.

As used herein, "CW light" refers to a light beam that is continues for a duration of at least 1 millisecond or at least 1 second or at least a minute or at least 10 minutes or at least one hour or more.

The parameters of the probe light can be the same as those of the pump pulse or, more preferably, they can be different. It is appreciated that since the probe light does not need to create a filamented region, it is not required to selects its parameters to effect light filamentation. Thus, the probe light can have any duration and energy.

For example, the probe light can be a pulse having a pulse duration on a nanosecond scale (e.g., from about 1 ns to about 100 ns). In various exemplary embodiments of the invention the pulse duration of the probe pulse does not exceed the relaxation time period of the filamented region. When it is desired to have a CW probe light, the first pulse is transmitted repeatedly at a repetition rate, selected such that the time period between successive transmissions of the first pulse is less than the relaxation time period of the filamented region.

The method ends at 13.

Herein, any reference to a light pulse in the singular form also encompass repetition of light pulses.

Thus, the term "a pump pulse" also encompasses a series of pump pulses, with a predetermined pulse repetition rate, and the term "a probe pulse" also encompass a series of probe pulses with a predetermined pulse repetition rate.

It is noted that the time-period between two successive pump pulses, and the time-period between two successive probe pulses do not have to be shorter than the relaxation time period of the filamented region. Further, the number of pulses in the series of pump pulses is not necessarily equal to the number of pulses in the series of probe pulses. Yet, in embodiments in which a pulsed probe light is used, the time period between a particular pump pulse and the probe pulse that immediately follows that particular pump pulse is preferably shorter than the relaxation time period of the filamented region, and in embodiments in which a CW probe light is used, the time period between successive transmissions of the first pulse is less than the relaxation time period of the filamented region.

Before providing a further detailed description of the method and system of the present embodiments, as delineated hereinabove, attention will be given to the advantages and potential applications offered thereby.

It is recognized that a light filament can propagate over distances much longer than the Rayleigh length. An atmospheric filament pulse typically initiates nonlinear dynamics in the densities of free electrons and ions, air density, and in the level of molecular alignment. Heretofore, these effect were believed to be suppressed or nonexistent after about 10 ns. The pulse leaves behind free electrons at initial densities of $10^{16}$-$10^{17}$ cm$^{-3}$, mostly from multi-photon ionization of oxygen molecules because the ionization potential of $N_2$ molecules is significantly larger (12 eV and 16 eV for $O_2$ and $N_2$, respectively).

Initially, the free electron density exhibits a radial bell-shape profile. In several researches conducted over the past two decades [see, e.g., Durfee and Milchberg, Phys. Rev. Lett. 71, 2409 (1993), Durfee et al., Phys. Rev. E 51, 2368 (1995), Tzortzakis et al., Opt. Commun 181, 123 (2000); and Pandey et al., Physics Of Plasmas 19, 023502 (2012)] it was established that a shock wave of electron density is formed 100-1000 picoseconds following the initial formation of bell-shape density profile of free electrons, and is propagating outwardly in supersonic speed.

This propagation of shockwave is accompanied by recombination between the free electrons and positive oxygen molecules resulting in a decrease of the plasma density by two orders of magnitude, over a relatively short time period of a few (e.g., 1-2) nanoseconds.

The present inventors have unexpectedly discovered that the relaxation time period of a created high-index filamented region is much larger than a few nanoseconds. This is unlike Varma et al. supra that discloses delay of no more than several picoseconds between the pump filament and the probe filament. This is also unlike Cheng et al. which discloses density holes in which the refractive index is lower than the refractive index of the surrounding air. The present inventors have therefore devised a technique that allows exploiting this phenomenon for various applications.

For example, the technique of the present embodiments can be used for processing a material. In these embodiments, a light source (e.g., a laser light source) is activated to emit the pump pulse in the direction of a material to form a filamented region between light source and the material. The probe light is then emitted by the same or, more preferably, but not necessarily, a different light source (e.g., a different laser source) to enter the filamented region and propagate therein. The parameters (e.g., duration, energy) of the pump light pulse are selected to form the filamented region as further detailed hereinabove. The parameters of the probe light are optionally and preferably selected to process the material. For example, when the material is a solid substrate, the parameters (e.g., duration, energy, wavelength) are selected to form a scribed region onto the surface of the substrate. In some embodiments of the present invention the wavelength of the probe light is selected to be within the range of wavelength to which the substrate is transparent, so that the probe light can form a scribed region buried under an external surface of substrate.

The technique of the present embodiments can also be used for melting or evaporating a material particularly a material that is located at a remote location, e.g., more than a meter or more than 10 meters or more than 100 meters or more than 1000 meters. In these embodiments, a light source (e.g., a laser light source) is activated to emit the pump pulse in the direction of the material at the remote location to form a filamented region between light source and the remote location. The probe light is then emitted by the same or, more preferably, a different light source (e.g., a different light source) to enter the filamented region and propagate therein. The parameters (e.g., duration, energy) of the pump pulse are selected to form the filamented region over a sufficiently long distance. The parameters of the probe light are optionally and preferably selected to melt or evaporate the material. These embodiments are useful both in the civilian applications and in military applications. In civilian applications, melting or evaporating can be used in the fabrication of various objects that require local evaporation or melting, e.g., for the purpose of forming patterns. In military applications, melting or evaporating is useful when the probe is emitted by a defensive or offensive laser weapon system for the purpose of damaging, disabling or destructing objects (e.g., rockets) or enemy personnel at remote locations. The parameters of the probe light can alternatively or additionally be selected for inducing explosion of an explosive material at the remote location.

The technique of the present embodiments can also be used for inducing water condensation in the medium, e.g., the atmosphere. For example, the pump pulse can initiates water condensation and the probe light can be transmitted into the filamented region to enhance the amount or rate of water condensation. This embodiment is particularly useful for modifying hydrometeors, for example, for the purpose of increasing precipitation. The advantage of this embodiment is that it is environmentally friendly, inexpensive, and does not require use of aircrafts or rockets as in conventional in cloud seeding techniques.

The technique of the present embodiments can also be used for optical communication. In these embodiments a filament is formed between a first location and a second location, where the distance between the two locations is at least 10 meters or at least 100 meters or at least 1000 meters. The filament can be formed by a pump pulse as further detailed hereinabove. Once the filament is formed, and during the relaxation period thereof, a probe light is transmitted to propagate through the filament. The probe light can encode a digital communication signal of any type (e.g., data, telephony, video). In various exemplary embodiments of the invention both the pump pulse that generates the filamented region and the probe light that encodes the communication signal are transmitted from the same location. This allows better synchronization between the two pulses. Also contemplated are configurations in which the pump pulse is transmitted from the remote location (e.g., in the direction of the local location), and the probe light is transmitted into the filamented region from the local location. Further contemplated are configurations in which the pump pulse is transmitted from the local location (e.g., in the direction of the remote location), and the probe light is transmitted into the filamented region from the remote location.

Figure 2:
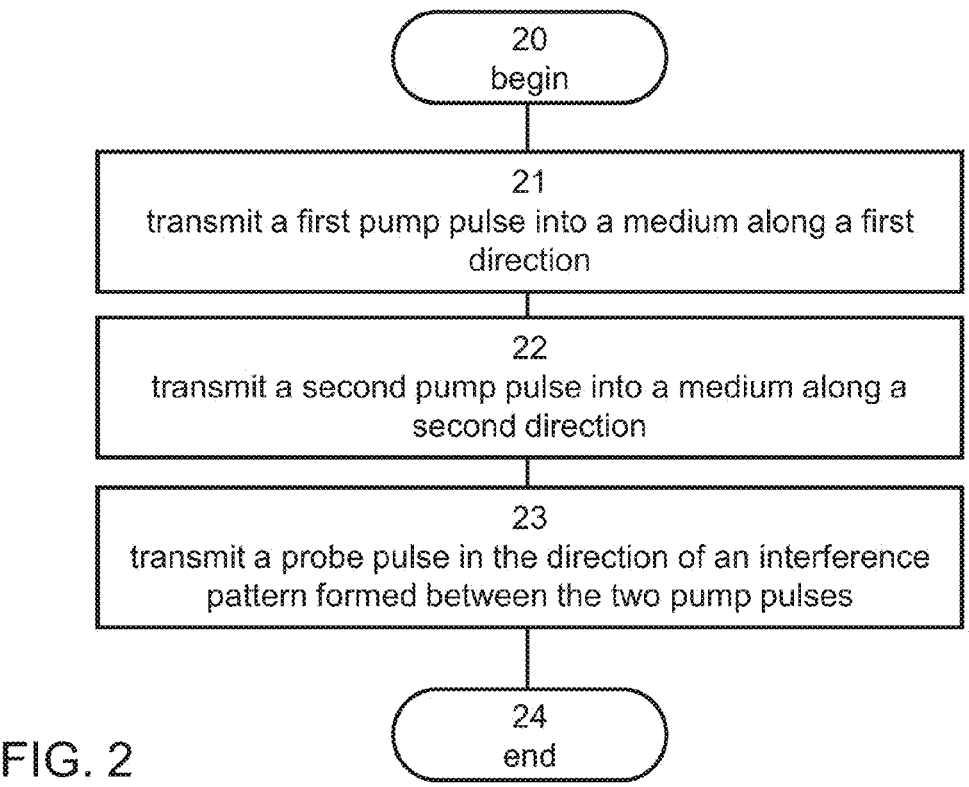
Figure 3:
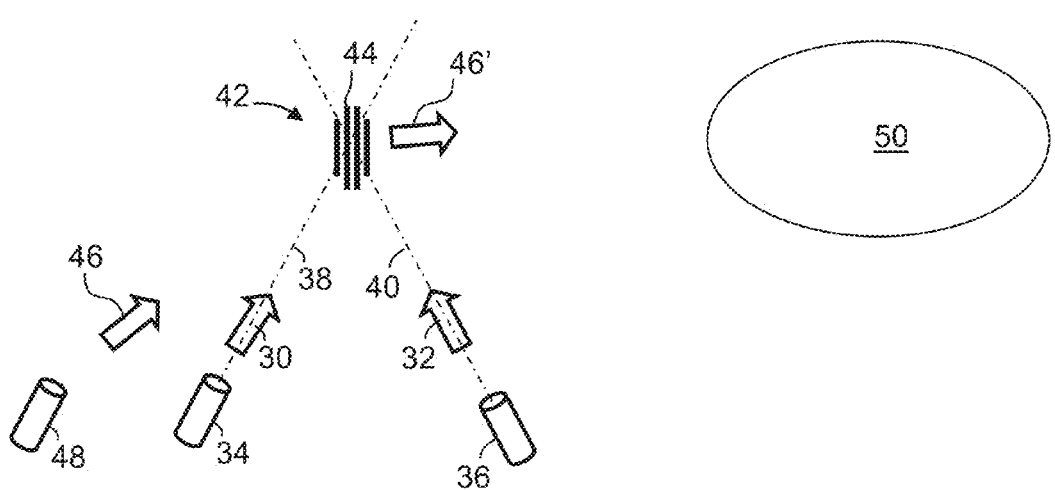

FIG. 2 is a flowchart diagram of a method suitable for generating a pattern of high refractive-index, according to various exemplary embodiments of the present invention. FIG. 3 is a schematic illustration showing the principles of the method shown in FIG. 2.

The method begins at 20 and continues to 21 at which first pump pulse 30 is transmitted into a medium, wherein the parameters of the first pump pulse 30 are selected to effect an increase in the refractive index as further detailed hereinabove.

The method continues to 22 at which a second pump pulse 32 is transmitted into the medium, wherein the parameters of the second pump pulse are selected also to effect an increase in the refractive index. The first pump pulse and second pump pulse can be transmitted from a respective first 34 and second 36 light sources (e.g., laser sources) and may have the same or different pulse duration and/or energy.

In various exemplary embodiments of the invention first pump pulse 30 is transmitted along a first direction 38 and second pump pulse 32 is transmitted along a second direction 40, wherein directions 38 and 40 intersect each other downstream the optical path of the first and second pump pulses. In various exemplary embodiments of the invention the instances at which pulses 30 and 32 are emitted from sources 34 and 36 are selected such that pulses 30 and 32 arrive in the intersection 42 at the same time. For example, when both pulses have the same optical path length from the respective light source to intersection 42, both pulses 30 and 32 can be transmitted simultaneously.

At the intersection 42, the optical fields of the first and second pump pulses interfere and a local interference pattern 44 is formed. Since both first 30 and second 32 pump pulses effect an increase in the refractive index of the medium, the regions in pattern 44 in which there is a destructive interference between pulses 30 and 32 are characterized by lower refractive index, and the regions in pattern 44 in which there is a constructive interference between pulses 30 and 32 are characterized by higher refractive index. Thus, pulses 30 and 32 form a transient diffraction grating at intersection 42.

The method optionally and preferably continues to 23 at which a probe light 46 is transmitted in the direction of pattern 44. Probe light 46 can be emitted by a separate light source (e.g., a laser source), as shown at 48, or it can be emitted by one of sources 34 and 36. Probe light 46 can optionally and preferably also be transmitted to propagate within a filamented region formed by one of pump pulses 30 and 32. The probe light can encode a digital communication signal of any type, as further detailed hereinabove.

The time period between the transmission time of probe light 46 and the transmission time of pump pulses 30 and 32 is preferably shorter than the relaxation time of the filamented regions created by the pump pulses. In some embodiments of the present invention this time period is at least at least 10 ns or at least 100 ns or at least 1 μs or at least 10 μs or at least 100 μs or at least 1 ms.

Probe light 46 propagate in the medium (e.g., air) until it arrives at pattern 44 at which it experiences diffraction and is therefore redirected as shown at 46'. The diffraction grating 44 and the angle of incidence of pulse 46 on grating 44, can be selected such that pulse 46 is redirected to propagate in the medium in the direction of a remote location 50. Thus, the technique of the present embodiments allows for a probe light to be redirected by a transient grating 44.

As used herein the term "about" refers to ±10%.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

The present example demonstrates the use of an electronically-delayed short optical pulse for probing the long-term effects generated by a femtosecond filamenting pulse in the atmosphere. The present example demonstrates that the filament induces a transient positive index-change lasting for approximately a microsecond. The present example further demonstrates demonstrate waveguiding through this induced positive index-change, and the formation of ultrashort acoustic waves and subsequently their outward propagation at the speed of sound.

Figure 4:
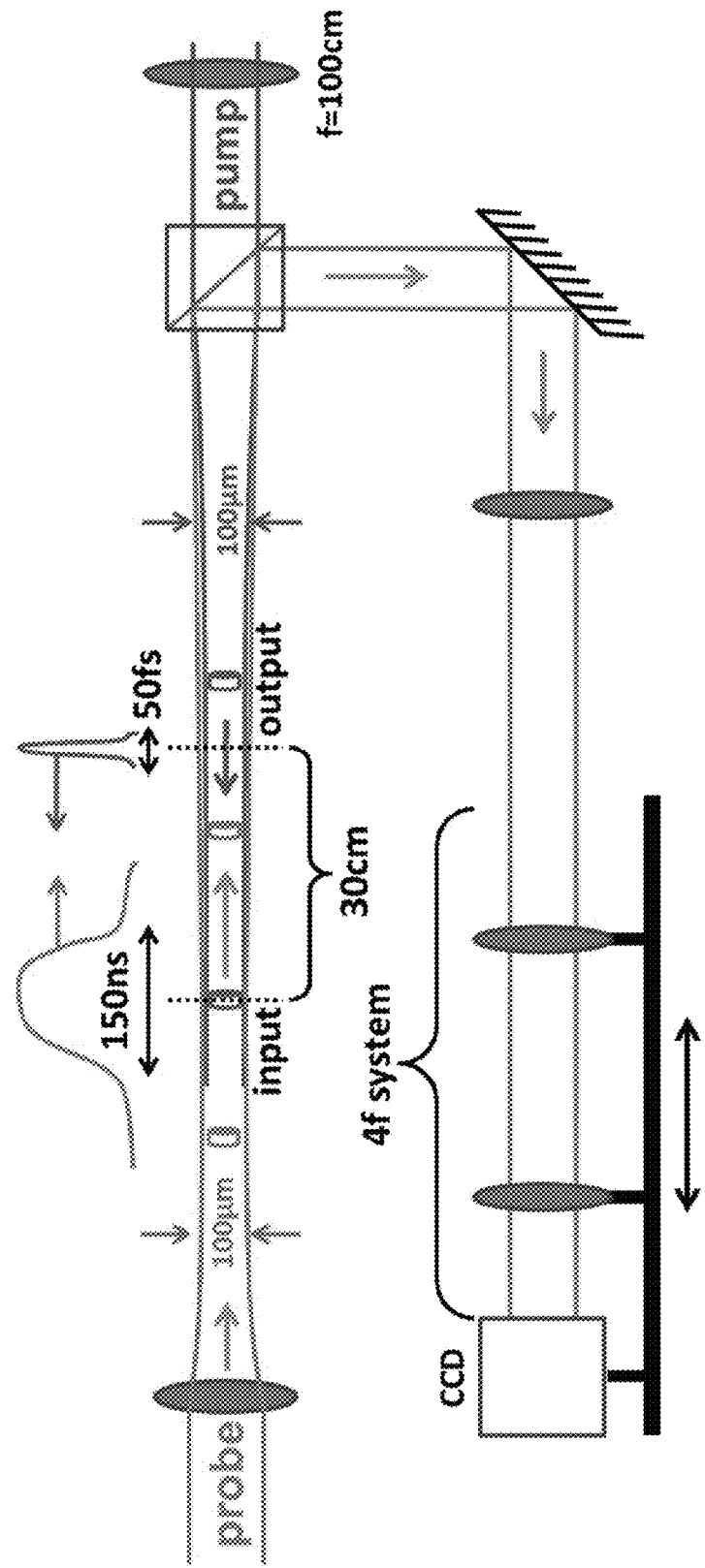

The experimental setup is shown in FIG. 4.

A "pump" Ti:Sapphire pulsed laser beam 1 cm wide with 50 fs time-duration, 1 mJ energy per pulse and at 1 KHz repetition rate was focused to a diameter of about 100 μm using a f=100 cm lens. The expected Raleigh range of such a beam is of the order of 2 cm. The beam forms a filament of about 30 cm in length in the free air. The filament wake was probed using a weak pulsed laser beam of wavelength 527 nm, with pulse-duration of 150 ns and 1 KHz repletion rate. The probe pulses were triggered by the femtosecond laser. The delay between the probe and pump pulses was controlled electronically. The experimental setup allowed spanning the delay over a range of one millisecond. The pump and probe beams propagated in opposite directions. This experimental setting helps in unraveling the induced index change, as the phase change accumulates along the filament, and at the same time the counter-propagation geometry allows separating the probe beam from the pump beam.

However, it is not intended to limit the scope of the present invention to this particular experimental setting.

In the present example, the "input" and "output" planes are defined as the entrance and exit planes of the probe pulse, which is propagating within the channel induced by the filament. A lens, a movable 4f system and a CCD camera were used to image the probe beam at the input and output planes.

In a first experiment, the probe beam was expanded such that it was approximately a plane wave at the input.

FIGS. 5A-F show the intensity pattern of the output probe beam at the output plane for several delay times with respect to the filament pulse. Shown in FIGS. 5A-F are the intensity structures of the probe beam at the output plane, for delay times of Δt=100 (FIG. 5A), Δt=300 (FIG. 5B), Δt=500 (FIG. 5C), Δt=640 (FIG. 5D), Δt=1100 (FIG. 5E) and Δt=1500 (FIG. 5F) nanoseconds after the filamenting pulse. Δt=0 corresponds to time delay at which the probe and pump pulses collide in the filament region.

FIG. 5G shows the ratio between the peak intensity at the center ($I_0$, shown by an arrow in FIG. 5B) and the intensity in intensity in the uniform background region ($I_{BG}$) as a function of the delay time between the probe and pump pulses. The outer ring that forms in (FIG. 5A) and subsequently expands and becomes stronger (FIGS. 5B-F) reflects an acoustic density wave discussed below. FIG. 5H is similar to FIG. 5G, except that it shows the ratios for different values of the pulse energy.

During the first 2/3 microseconds, the intensity of the output probe beam in the region of the center of the filament wake increases. The period within which the center is larger than the background lasts for approximately 1.55 microseconds. This intensity profile demonstrates the presence of a positive index change at the center of the filament wake, which pulls the light from the ring into the center.

In a second experiment an f=100 cm lens that focuses the probe beam into a diameter of about 100 μm was used at the input plane.

Figures 6A, 6B, 6C, 6D:
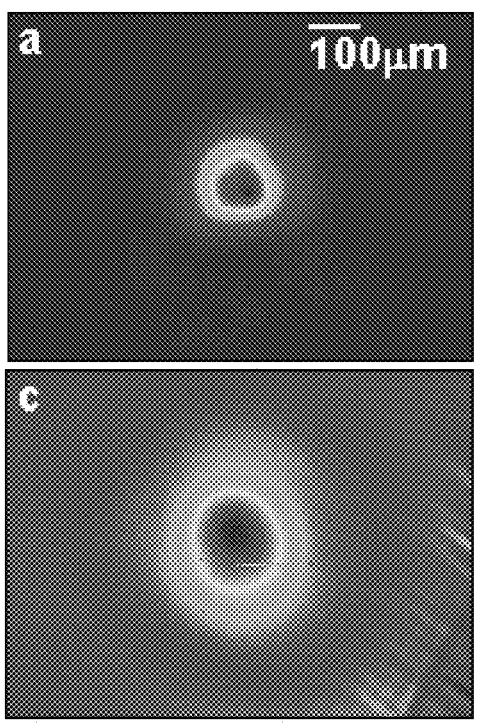

FIGS. 6A-D demonstrate the filament-induced waveguide of the present embodiments. FIG. 6A shows intensity pattern of the focused probe beam at the input plane. FIG. 6B shows the intensity pattern of the probe beam at the output plane when the pump beam is blocked; FIG. 6C shows intensity pattern of the guided probe beam at the output plane for delay time of 800 ns with respect to the 30 cm filament, and FIG. 6D shows the fraction of power localized within a guiding region (defined in the present example as a circle with 300 μm diameter). Each plot in FIGS. 6A-C is normalized separately. The line in the lower right corners of FIGS. 6B and 6C corresponds to a wire that was used for spotting the output plan.

When the pump beam is blocked, no filament is formed. In this case, the probe beam is propagating in free air and is broadening considerably due to diffraction (FIG. 6B). FIGS. 6C and 6D demonstrate that the beam is guided within the waveguide induced by the filament.

This experiment demonstrates that the filament induces a positive index structure surviving about 1.5 microseconds after the 50 fsec filament pulse has passed and that it can be used for long-term guiding of another beam. Based on the diameter of the guided probe, the peak value of this positive index change is estimated at about $10^{-6}$.

Without wishing to be bound to any particular theory, the physical mechanism giving rise to the observed positive index change is believed to and to be attributed to one or more of the following: (1) high density of air, (2) a temperature increase that excites the molecules into higher energy levels and therefore increase their polarizability, and (3) population of negative ions with large polarizability. High density of air may results from the following chain of events. The femtosecond pulse transfers heat to the air, increasing its temperature and leading to a central region with relative low pressure. Then, the air cools and a wind blows towards the center in order to balance the pressures. Consequently, a spike of higher air density is formed in the center.

Formation and outgoing propagation of sound-waves produced within the wake of the filaments were also observed. The acoustic wave is formed during the same time-window as the central spike with positive index change.

FIGS. 8A-B show formation of the acoustic pulse, where FIG. 8A shows one-dimensional intensity profiles of the probe beam at the output plane at 0.64, 1.1 and 1.5 microseconds delay times, and FIG. 8B shows the radius of the first ring crest as a function of time delay.

The formation of the leading ring crest of the acoustic pulse is shown in FIGS. 5A-F and also in FIG. 8A which shows line cuts of FIGS. 5D, 5E and 5F. The leading crest is formed at 0.08 μsec, yet it starts to propagate at 0.3 μsec delay times (FIG. 8B). The second and third crest rings are formed at 0.78 μsec and 0.62 μsec delay times, respectively.

FIGS. 7A-F show the outgoing propagation of the sound wave. FIGS. 7A-E show the intensity of the probe beam (for a plane-wave launch configuration similar to that of FIGS. 5A-G) at the output plane, for several delay times. These plots show the three-cycle acoustic pulse. FIG. 7F shows the radius of the leading crest as a function of the delay time from which the wave velocity of 333±1 m/s was calculated. This value is comparable to the sound velocity in air, thereby showing that the wave is indeed an acoustic wave.

The dynamics of the air density has been simulated by computerized hydrodynamic simulations, following the model presented in [23] with the addition of radiative cooling [Rossi et al., 2010, Combust. Sci. and Tech 182, 1457]. The result simulations is shown in FIGS. 9A-C. FIG. 9A shows radial air density $\rho(r)$ as a function of the time delay $\Delta t$. At the beginning ($\Delta t=0$) the medium is homogeneous, with $\rho(r)=\rho_0$. The density at the center ($r=0$) initially becomes lower due to the sudden heating. Subsequently, the temperature is lowered by rapid radiative cooling and air starts to move inwards, leading to increased air density at the center. The inset of FIG. 9A shows density profiles at time delays of $\Delta t=0$ μsec (dashed line) and $\Delta t=0.5$ μsec (solid line) after the filamenting pulse. FIGS. 9B and 9C show the simulated optical intensity patterns of the probe beam at the output plane after propagating through 30 cm of air, at delay times of 0.5 and 1.1 μsec, respectively.

As demonstrated in FIGS. 9A-C, shortly after the pump pulse has initiated the filamentation process, the air expands outwards from the beam axis. Without wishing to be bound by any particular theory, it is assumed that this happens because the pump beam heats the gas and therefore creates a local pressure peak. During the outward expansion, the hot gas cools down by radiation, along with mechanical work and heat conduction. The combination of density decrease together with the cooling reverses the pressure gradient and leads to inflow of air towards the center, and to the formation of central region whose density is higher than the background air density.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

[1] A. Braun, G. Korn, X. Liu, D. Du, J. Squier, and G. Mourou, Opt. Lett. 20, 73 (1995).
[2] L. Berge, S. Skupin, R. Nuter, J. Kasparian and J-P. Wolf, Rep. Prog. Phys. 70 1633 (2007).
[3] A. Couairon and A. Mysyrowicz, Physics Reports 441, 47 (2007).
[4] M. Rodriguez, R. Bourayou, G. Méjean, J. Kasparian, J. Yu, E. Salmon, A. Scholz, B. Stecklum, J. Eislöffel, U. Laux, A. P. Hatzes, R. Sauerbrey, L. Wöste, and J.-P. Wolf, Phys. Rev. E 69, 036607 (2004).
[5] J. Kasparian, M. Rodriguez, G. Méjean, J. Yu, E. Salmon, H. Wille, R. Bourayou, S. Frey, Y.-B. André, A. Mysyrowicz, R. Sauerbrey, J.-P. Wolf and L Wöste, Science, 301, 61 (2003).
[6] G. Méchain, A. Couairon, Y.-B. André, C. D'amico, M. Franco, B. Prade, S. Tzortzakis, A. Mysyrowicz, and R. Sauer-brey, Appl. Phys. B: Lasers Opt. B79, 379 (2004).
[7] M. S. Mills, M. Kolesik, and D. N. Christodoulides, Opt. Lett., 38, 25 (2013); Chin, S. L. et al. Filamentation of femtosecond laser pulses in turbulent air. Appl. Phys. B74, 67-76 (2002).
[8] R. Salame, N. Lascoux, E. Salmon, J. Kasparian and J.-P. Wolf, Propagation of laser filaments through an extended turbulent region. Appl. Phys. Lett. 91, 171106 (2007).
[9] S. L. Chin et al., Filamentation of femtosecond laser pulses in turbulent air. Appl. Phys. B74, 67 (2002).
[10] Q. Luo et al., Appl. Phys. B82, 105 (2006).
[11] P. Rohwetter et al., Nature Photonics 4, 451 (2010)
[12] C. G. Durfee and H. M. Milchberg, Phys. Rev. Lett. 71, 2409 (1993).
[13] C. G. Durfee, J. Lynch and H. M. Milchberg Phys. Rev. E 51, 2368 (1995).
[14] S. Tzortzakis, B. Prade, M. Franco and A. Mysyrowicz, Opt. Commun. 181, 123 (2000).
[15] P. K. Pandey, S. L. Gupta, V. Narayanan, and R. K. Thareja, Physics Of Plasmas 19, 023502 (2012).
[16] M. Châteauneuf, S. Payeur, J. Dubois, and J.-C. Kieffer, Appl. Phys. Lett. 92, 091104 (2008).
[17] C. D'Amico, A. Houard, M. Franco, B. Prade, A. Mysyrowicz, A. Couairon, and V. T. Tikhonchuk, Phys. Rev. Lett. 98, 235002 (2007).
[18] B. Zhou et al., Optics Express 17, 11450 (2009).
[19] H. Stapelfeldt and T. Seideman, Rev. Mod. Phys. 75, 543 (2003).
[20] R. A. Bartels, T. C. Weinacht, N. Wagner, M. Baertschy, C. H. Greene, M. M. Mumane, and H. C. Kapteyn, Phys. Rev. Lett. 88, 013903 (2001).
[21] S. Varma, Y.-H. Chen, and H. M. Milchberg, Phys. Rev. Lett. 101, 205001 (2008).
[22] F. Calegari, C. Vozzi, and S. Stagira, Phys. Rev. A 79, 023827 (2009).
[23] Y.-H. Cheng, J. K. Wahlstrand, N. Jhajj, and H. M. Milchberg, Optics Express, 21 4740 (2013).
[24] A. L. Yarin, Annu. Rev. Fluid Mech. 38, 159 (2006).
[25] B. Zhou et al., Optics Express 17, 11450 (2009).

What is claimed is:

1. A method of transmitting light, comprising:
    transmitting a first light pulse into a medium to form in said medium a filamented region characterized by a refractive index higher than a refractive index of said medium in the absence of said light pulse; and
    transmitting a second light pulse into said filamented region, at an angle selected to effect a two-dimensional spatial confinement of said second tight pulse in said filamented region such that said second light pulse is guided by said filamented region,
    wherein said second light pulse is transmitted at least 10 nanoseconds after said first light pulse.

2. A method of processing a material comprising executing the method of claim 1 and directing said first and said second light pulses onto the material.

3. The method of claim 2, wherein the material is a solid substrate and said second light pulse is selected to form a scribed region onto a surface of said substrate.

4. The method of claim 2, wherein the material is a solid substrate transparent to said light pulses and wherein said second light pulse is selected to form a scribed region buried under an external surface of said substrate.

5. The method of claim 2, wherein said second light pulse is selected to at least partially melt or evaporate the material.

6. The method of claim 2, wherein said second light pulse is selected for destructing an object which comprises the material and is located at a remote location.

7. The method of claim 1, being executed so as to induce water condensation in said medium.

8. The method according to claim 1, wherein said first light pulse and said second light pulse are transmitted from the same location.

9. The method according to claim 1, wherein said first light pulse and said second light pulse are transmitted from different locations.

10. A system for transmitting light, comprising:
at least one light source configured for transmitting light pulses; and
a controller configured for activating said at least one light source to transmit a first light pulse into a medium to form in said medium a filamented region characterized by a refractive index higher than a refractive index of said medium in the absence of said light pulse, and to transmit a second light pulse into said filamented region at an angle selected to effect a two-dimensional spatial confinement of said second light pulse in said filamented region such that said second light pulse is guided by said filamented region,
wherein said second light pulse is transmitted at least 10 nanoseconds after said first light pulse.

11. The system of claim 10, wherein said at least one light source comprises a first light source for transmitting said first light pulse, and a second light source for transmitting said second light pulse.

12. The system of claim 10, wherein said at least one light source comprises one light source for transmitting both said first light pulse and said second light pulse.

13. An optical communication system, comprising the system according to claim 10.

14. A system for processing a material comprising the system according to claim 10.

15. The method or system according to claim 1, wherein said second light pulse is transmitted at least 100 nanoseconds after said first light pulse.

16. The method or system according to claim 1, wherein a duration of said first light pulse is less than one picosecond.

17. The method or system according to claim 1, wherein said first light pulse has energy of at least 100 microjoule.

18. A method of generating a refractive index pattern, comprising:
transmitting first pump pulse into a medium along a first direction, and a second pump pulse into said medium along a second direction, each of said first and said second pump pulses being selected to effect a transient change in the refractive index of said medium;
wherein said first and said second directions are selected to intersect each other at an intersection region, and to form in said intersection region a refractive index pattern corresponding to an interference pattern of said pump pulses;
wherein the method comprise transmitting probe light to said refractive index pattern to effect diffraction of said probe light by said refractive index pattern.

19. A method of transmitting light, comprising:
transmitting a first light pulse into a medium to form in said medium a filamented region capable of guiding light; and
transmitting a continuous light into said filamented region, at an angle selected to effect a two-dimensional spatial confinement of said continuous light in said filamented region such that said continuous light is guided by said filamented region,
wherein said continuous light is transmitted at least 10 nanoseconds after said first light pulse.

20. A system for transmitting light, comprising:
at least one light source configured for transmitting light pulses; and
a controller configured for activating said at least one light source to transmit a first light pulse into a medium to form in said medium a filamented region capable of guiding light, and to transmit a continuous light into said filamented region, at an angle selected to effect a two-dimensional spatial confinement of said continuous light in said filamented region such that said continuous light is guided by said filamented region,
wherein a diameter of a focal point of said first light pulse is from about 50 µm to about 200 µm, and wherein said continuous light is transmitted at least 10 nanoseconds after said first light pulse.

21. An optical communication system, comprising the system according to claim 20.

22. A system for processing a material comprising the system according to claim 20.

23. The method of claim 1, wherein a diameter of a focal point of said first light pulse is from about 50 µm to about 200 µm.

24. The system of claim 10, wherein a diameter of a focal point of said first light pulse is from about 50 µm to about 200 µm.

25. The method of claim 19, wherein a diameter of a focal point of said first light pulse is from about 50 µm to about 200 µm.

26. The system of claim 20, wherein a diameter of a focal point of said first light pulse is from about 50 µm to about 200 µm.

27. The method of claim 18, wherein said probe light encodes an optical communication signal, and wherein said interference pattern is selected to redirect said optical communication signal to a remote optical communication receiver.

* * * * *

UNITED STATES PATENT AND TRADEMARK OFFICE
CERTIFICATE OF CORRECTION

PATENT NO. : 9,544,065 B2  
APPLICATION NO. : 14/327702  
DATED : January 10, 2017  
INVENTOR(S) : Mordechai Segev et al.

Page 1 of 1

It is certified that error appears in the above-identified patent and that said Letters Patent is hereby corrected as shown below:

In the Claims

In Claim 1, Column 14 at Line 55, "tight" should be changed to --light--

In Claim 15, Column 15 at Line 43, "method or system" should be changed to --method--

In Claim 16, Column 15 at Line 46, "method or system" should be changed to --method--

In Claim 17, Column 15 at Line 48, "method or system" should be changed to --method--

Signed and Sealed this  
Twenty-ninth Day of January, 2019

Andrei Iancu  
*Director of the United States Patent and Trademark Office*